United States Patent [19]

Briggs

[11] 4,275,777
[45] Jun. 30, 1981

[54] TABLE SAW CARRIAGE ATTACHMENT

[76] Inventor: Louis H. Briggs, Rte. 3, Box 198, Elberton, Ga. 30635

[21] Appl. No.: 85,050

[22] Filed: Oct. 15, 1979

[51] Int. Cl.³ .............................................. B27C 5/06
[52] U.S. Cl. .................................. 144/138; 29/27 R; 29/560; 83/439; 144/1 R; 144/48; 269/69
[58] Field of Search ........................ 33/180 R, 185.12; 29/560, 27 A, 27 C, 27 R; 144/1 R, 3 R, 48, 138; 269/46, 69, 82, 88, 100; 83/411 R, 415, 439, 733

[56] References Cited

U.S. PATENT DOCUMENTS

| | | | |
|---|---|---|---|
| 431,525 | 7/1890 | Mattison | 144/1 R |
| 2,001,306 | 5/1935 | Gressner | 144/138 |
| 2,085,236 | 6/1937 | Tautz | 83/415 X |
| 2,157,310 | 5/1939 | Ward | 83/439 |
| 2,696,230 | 12/1954 | Libby | 83/439 |
| 2,720,897 | 10/1955 | Kairath | 83/439 X |
| 2,766,784 | 10/1956 | Antczak | 83/439 X |
| 3,048,387 | 8/1962 | Waggoner | 269/69 X |
| 3,269,435 | 8/1966 | Houston, Jr. | 83/439 |
| 4,047,458 | 9/1977 | Hall | 83/439 |

*Primary Examiner*—W. D. Bray
*Attorney, Agent, or Firm*—Bailey, Dority & Flint

[57] ABSTRACT

Carriage attachment apparatus is disclosed for carrying a workpiece on an associated saw table whereby planar surfaces may be formed by sawing with common attachment between the carriage and a woodturning lathe being provided so that the sawed product is turned about the same rotational axis affording a high degree of symmetry.

8 Claims, 5 Drawing Figures

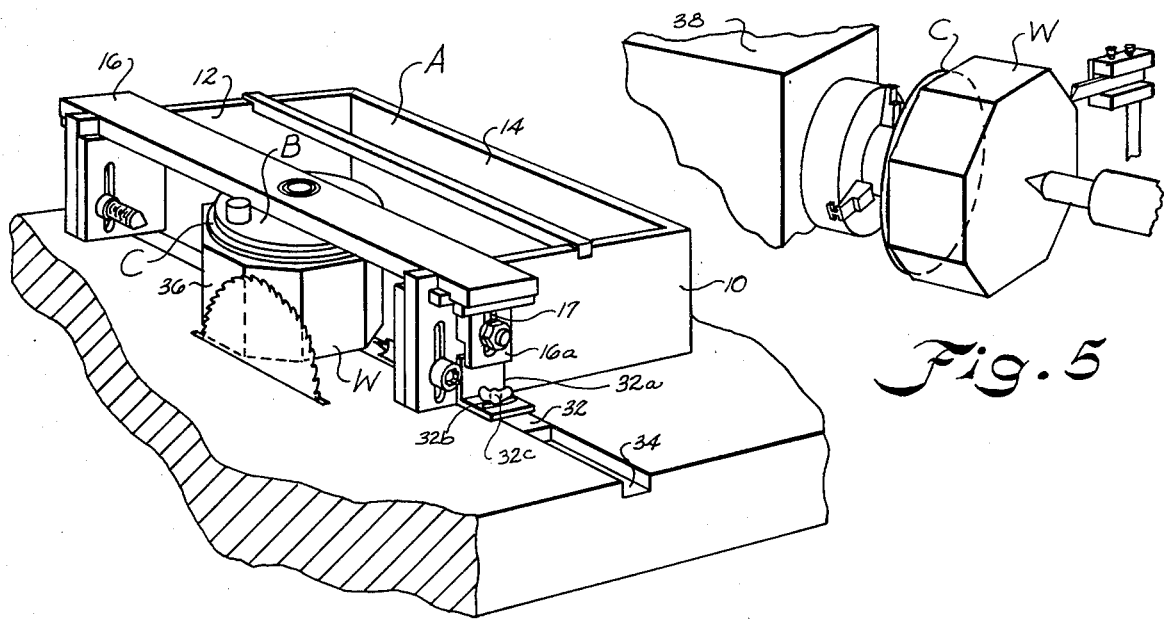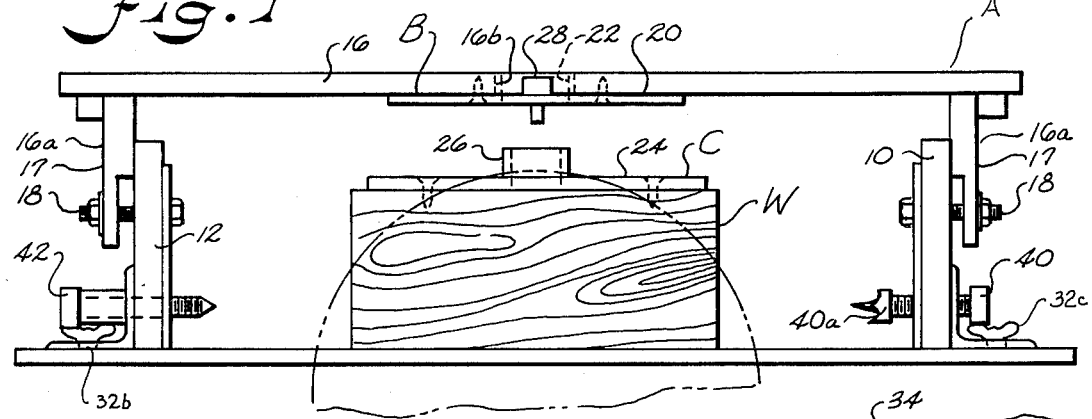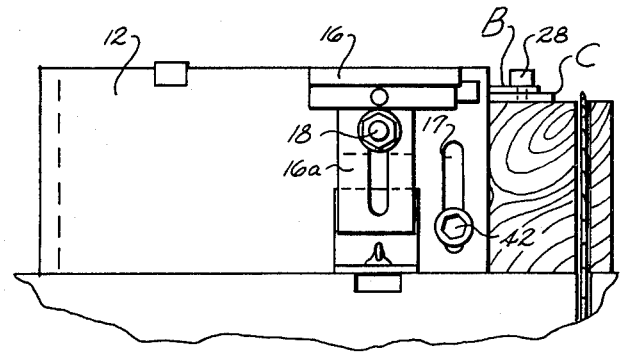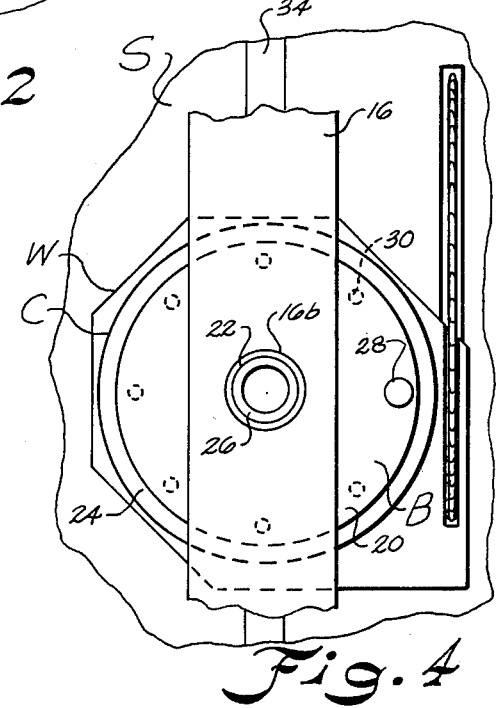

TABLE SAW CARRIAGE ATTACHMENT

BACKGROUND OF THE INVENTION

The invention relates to the making of products by sawing and then turning a stock or workpiece of wood on a lathe. Often this includes the building up of a block of wood by using laminates of different colors so that the final turned product has a pattern design such as in the construction of shallow bowls, dishes, and lamp bases.

Heretofore, the workpiece has been drilled out with a center hole and a plurality of index holes and then fitted on a wooden jig having a center dowel and a radial dowel. However, the problem arises that the workpiece must first be sawed into a number of desired planar surfaces, and then removed and mounted on the turning lathe. In transferring the workpiece from the saw table to the turning lathe, the problem arises that the center of rotation about which the workpiece is sawed and then turned is altered resulting in a lopsided figure. The accuracy of the sawing operation is also critical to the symmetry of the final turned product. Therefore, the accuracy of the sawing operation and the axis of rotation about which the workpiece is turned on the saw and on the lathe are problems which require considerable attention.

U.S. Pat. No.2,001,306 discloses a table saw attachment for sawing tapered surfaces on a workpiece.

SUMMARY OF THE INVENTION

It has been found that accessory attachment apparatus for holding and guiding a workpiece on an associated table saw may be had by which the workpiece may be turned about a vertical axis for the sawing of uniform planar surfaces and subsequently removed and attached to a lathe for turning about a horizontal axis by providing a carriage having spaced sides between which an index guide plate is carried which rotatably receives an attachment plate affixed to the workpiece whereby the workpiece is turned about an axis of rotation and guided to the saw in an accurate manner and subsequently the attachment plate and sawed workpiece may be attached to a lathe for turning into a finished product about the same axis.

Accordingly, an important object of the present invention is to provide a carriage apparatus by which a workpiece may be carried on a work table and turned on a lathe to produce an accurately turned, symmetrical product.

Still another important object of the present invention is to provide a workpiece carriage for attachment to an associated saw table by which a workpiece may be accurately rotated and guided to a saw blade for forming planar surfaces thereon and, subsequently, transferred to a turning lathe without altering the axis of rotation of the product.

Yet another important object of the present invention is to provide carriage apparatus by which a workpiece may be carried on an associated saw table and turned about either a vertical or horizontal axis.

BRIEF DESCRIPTION OF THE DRAWING(S)

The construction designed to carry out the invention will be hereinafter described, together with other features thereof.

The invention will be more readily understood from a reading of the following specification and by reference to the accompanying drawing(s) forming a part thereof, wherein an example of the invention is shown and wherein:

FIG. 1 is a perspective view illustrating carriage attachment apparatus constructed according to the invention attached to a conventional saw table;

FIG. 2 is a front elevation illustrating carriage attachment apparatus constructed according to the invention;

FIG. 3 is a side view illustrating carriage attachment apparatus according to the invention;

FIG. 4 is a top plan view of carriage attachment apparatus according to the invention with parts cut away to illustrate the index guide for the workpiece; and FIG. 5 illustrates a sawed workpiece being transferred and attached to a lathe according to the invention.

DESCRIPTION OF A PREFERRED EMBODIMENT

The invention relates to woodworking and more particularly to the turning of a stock or workpiece about a center for forming a final curved or rounded product such as a shallow dish or lamp base.

Referring now to the drawing, accessory attachment apparatus is illustrated for a table saw S of the type having a guide slot by which a workpiece may be guided relative to an associated saw blade. The apparatus includes a carriage means A by which the workpiece is carried relative to the saw table and blade having spaced apart sides and a bridge plate extending between the sides. An index attachment means B is carried by the bridge plate and an attachment plate C is adapted for attachment to the workpiece which is rotatably carried by the index attachment means B to provide an axis of rotation about which the workpiece is rotated. Index stop means is provided for locking the attachment plate and index attachment means together in one of a plurality of predetermined rotational positions. A guide means is carried by the carriage means for guiding the carriage means in the saw table guide slot to present the workpiece in a plurality of rotated positions to the saw blade for sawing planar surfaces on the workpiece. The attachment plate is adapted for attachment to a wood-turning lathe so that the attachment plate and attached, sawed workpiece may be removed and attached to a turning lathe whereby the workpiece is turned about the same axis of rotation to produce a highly symmetrically turned product.

As illustrated, the carriage attachment apparatus A is shown carrying a block of wood W which is to be sawed into an eight-sided figure.

Referring now to the drawing in more detail, the carriage apparatus A is illustrated as including a pair of spaced apart sides 10 and 12 and a back side frame member 14. Bridge plate 16 extends between sides 10 and 12 and is carried for vertical adjustment by means of downwardly extending legs 16a having a vertical slot 17 formed therein which receives a threaded end of a bolt 18 extending from the inside of side walls 10 and 12.

Index attachment means B includes an index guide plate 20 affixed underneath the bridge plate 16 having an open flanged hub 22 extending through an aperture 16b formed in the top of the bridge plate. Attachment plate C includes a round mounting plate 24 having a central hub 26 which is received in the hub 22 of guide plate 20 for rotation therein. Plates 20 and 24 may be attached by any suitable means such as by wood screws as illustrated. It may be noted, that the attachment plate 24 may be simply rotatably received in the hub 22 of guide plate 20 and need not be vertically connected such that the workpiece W may rest on the saw table and wedged with the bridge plate 16b being lowered and secured over the hub 26.

Index stop means for locking the attachment plate 24 and index attachment plate 20 unitarily together in one of a plurality of predetermined rotational positions is provided by an indexing pin 28 carried by the plate 20 and a desired number of indexing openings 30 formed in the attachment plate corresponding to the desired number of planar surfaces which it is desired to form in the workpiece W. Of course, it is imperative that the openings 30 be formed in the attachment plates accurately so that the planar surfaces will be cut symmetrically. The pin 28 may be spring-loaded or may be threaded at the tip end thereof into openings 30.

The carriage means A may be guided across the saw table by means of a guide bar 32 attached to the underneath side of sides 10 and 12 which fits in guide slot 34 normally found on a saw table. By this means, the carriage may be guided to present the workpiece in a plurality of positions to the saw blade for sawing planar surfaces on the workpiece. "L"-shaped brackets 32a may be utilized for attaching the carriage and guide bar as illustrated. Piece 32a has an elongated slot 32b at right angle to the saw blade to receive the vertical pins 32c attached to the guidebar, thus allowing the carriage to be moved in relation to the guidebar and in relation to the sawblade. As laminates are added, adjustments in the position of the workpiece relative to the sawblade may be made to allow for laminate buildup of the workpiece.

Once the workpiece has been sawed into the desired number of planar surfaces 36, the workpiece and attachment plate C may be removed from the carriage and attached to a turning lathe, such as illustrated in part at 38. This is done directly without removal of the workpiece from the attachment plate so that the workpiece is turned about the same axis of rotation as it was sawed to produce a highly symmetrical turned product. For this reason, the attachment plate includes the central hub 26 which may be provided with threads internally so as to be screwed on the turning lathe, or the attachment plate may be secured to the turning lathe by means of a conventional chuck in which the central hub 26 is inserted and gripped.

The carriage means A may also be utilized for turning a workpiece about a horizontal axis rather than a vertical axis as has been heretofore described. In this operation, horizontal mounting means is provided by opposed horizontal attachment pins 40 and 42 carried by opposing spaced apart sides 10 and 12. It will be noted that the pin 40 includes a pointed crown 40a which grips the workpiece and prevents it from rotating relative to the attachment pins. In this manner, an elongated workpiece such as a base for a table lamp may be held and centered between the pins. The pins may be threadably carried by sides 10 and 12 so as to tighten against the workpiece held therebetween. A first pass across the saw blade will provide a planar surface on the workpiece which will then be rested upon the saw table and a second planar cut made across the workpiece. This will be done until the workpiece has been cut into the desired number of planar surfaces, at which time the workpiece may be removed and placed on a lathe by means of the same centering holes and turned into the final product.

Thus, it can be seen that a highly advantageous construction can be had for a carriage apparatus for holding a workpiece and guiding the workpiece during sawing operations in a highly accurate manner whereby the workpiece may then be removed and turned on a lathe about the same axis of rotation for producing a highly symmetrical finish turned product.

While a preferred embodiment of the invention has been described using specific terms, such description is for illustrative purposes only, and it is to be understood that changes and variations may be made without departing from the spirit or scope of the following claims.

What is claimed is:

1. Accessory attachment apparatus for a table saw and the like for holding a workpiece for sawing and turning, said apparatus comprising:

a carriage means by which said workpiece is carried relative to said saw table and blade;

said carriage means including spaced apart sides;

bridge plate means extending between said sides;

index attachment means carried by said bridge plate means;

an attachment plate rotatably carried by said index attachment means to provide an axis of rotation about which said workpiece is turned for sawing;

connecting means for affixing said workpiece to said attachment plate;

index stop means for locking said attachment plate and index attachment means unitarily together in one of a plurality of predetermined rotational positions;

means for guiding said saw blade and carriage means relative to one another as said workpiece is presented in one of said plurality of rotated positions for sawing a planar surface thereon; and said attachment plate including attachment means for attaching said attachment plate to a turning lathe so that said attachment plate and affixed sawed workpiece may be unitarily removed and attached to a turning lathe whereby said workpiece may be turned about said same axis of rotation to produce a highly symmetrical turned product.

2. The apparatus of claim 1 wherein said carriage means includes means for adjusting the vertical position of said bridge plate means to accommodate workpieces of different heights, said workpiece being carried underneath said bridge plate means resting on said saw table.

3. The apparatus of claim 1 wherein said index attachment means includes an index guide plate carried by said bridge plate means having an attachment aperture formed therein, said attachment plate including a central hub receivable in said attachment aperature, said index stop means including an index pin carried by said index guide plate and cooperating pin receiving openings formed circumferentially spaced in said attachment plate.

4. The apparatus of claim 3 wherein said index guide plate and attachment plate are carried generally flush underneath said bridge plate means, said carriage means including means for adjusting the vertical position of said bridge plate means to accommodate workpieces of different heights; said workpiece being wedged between said bridge plate and saw table for movement through said saw blade.

5. The apparatus of claim 1 including horizontal mounting means carried by said spaced sides of said carriage means for attaching a workpiece to said carriage in a horizontal manner whereby said workpiece may be turned and sawed along a horizontal axis.

6. The apparatus of claim 5 wherein said horizontal mounting means includes pins carried for vertical adjustment between which said workpiece is supported.

7. The apparatus of claim 1 wherein said means for guiding said saw blade and carriage means includes a guide slot formed in said saw table and a guide bar carried by said carriage means received in said guide slot whereby said carriage means and workpiece are guided to said saw blade.

8. The apparatus of claim 1 wherein said means for guiding said carriage means includes a guide bar carried by said carriage means receivable in a longitudinal guide slot of said saw table, bracket means connecting said carriage means and guide bar having means for adjusting the position of said carriage means and workpiece held thereby laterally relative to said saw blade to accommodate the buildup of laminates on said workpiece.

* * * * *